(12) United States Patent
Hermann

(10) Patent No.: US 12,709,216 B2
(45) Date of Patent: Aug. 18, 2026

(54) HEADLAMP ASSEMBLY FOR A VEHICLE

(71) Applicant: VOLVO TRUCK CORPORATION, Gothenburg (SE)

(72) Inventor: Olivier Hermann, Saint-Maurice-sur-Dargoire (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/331,554

(22) Filed: Sep. 17, 2025

(65) Prior Publication Data

US 2026/0077705 A1 Mar. 19, 2026

(30) Foreign Application Priority Data

Sep. 18, 2024 (EP) .................................... 24201121

(51) Int. Cl.
*B60Q 1/00* (2006.01)
*F21S 41/29* (2018.01)

(52) U.S. Cl.
CPC ......... *B60Q 1/0064* (2013.01); *B60Q 1/0017* (2013.01); *F21S 41/29* (2018.01); *B60Q 2900/20* (2013.01)

(58) Field of Classification Search
CPC .......... B60Q 1/00–007; B60Q 1/02–20; B60Q 2900/20; F21S 41/20–295; F21S 45/50
See application file for complete search history.

(56) References Cited

U.S. PATENT DOCUMENTS 4,604,679 A * 8/1986 Rolando ................. F21S 41/29
362/348
2024/0151378 A1 5/2024 Dong

FOREIGN PATENT DOCUMENTS

| | | | |
|---|---|---|---|
| CA | 2472872 | A1 | 6/2005 |
| CN | 215808277 | U | 2/2022 |
| DE | 19607798 | A1 | 9/1996 |
| JP | H11219603 | A | 8/1999 |
| JP | 2000156105 | A | 6/2000 |

OTHER PUBLICATIONS

Extended European Search Report in corresponding European Application No. 24201121.1 dated Feb. 17, 2025 (5 pages).

* cited by examiner

*Primary Examiner* — Jason M Han
(74) *Attorney, Agent, or Firm* — Jeffri A. Kaminski; Venable LLP

(57) ABSTRACT

A headlamp assembly for a vehicle has a housing including a bonding groove provided with at least one inner wall, and a lens to be assembled to the housing by means of an assembly end of the lens placed in a bonding element located in the bonding groove. A housing bonding element removal system is positioned on at least one inner wall of the bonding groove. A disassembly system has at least one disassembly element on the housing, the disassembly element being movable towards the lens and capable of disassembling the lens from the housing by pressing against the lens when moved.

15 Claims, 5 Drawing Sheets

HEADLAMP ASSEMBLY FOR A VEHICLE

TECHNICAL FIELD

The disclosure relates generally to the assembly and disassembly of a housing and a lens of a headlamp for a vehicle. In particular aspects, the disclosure relates to a headlamp assembly which can be disassembled in a manner suitable for recycling. The disclosure also relates to a method for assembling the headlamp assembly. Although the disclosure may be described with respect to a particular vehicle, the disclosure is not restricted to any particular vehicle.

BACKGROUND

Vehicle headlamps are basically made up of a housing or main structure, inside which bulbs or light-emitting devices are housed, located opposite the front portion of the headlamp, this front portion being closed by a transparent wall, called a lens, and made of glass or plastic, through which the light emitted by the bulbs or emitting devices is projected.

The housing and the lens are bonded together using a polymerized adhesive to ensure a good interface and seal. A flame or plasma treatment activates the bonding surface of the housing.

The disadvantage is that once the housing and the lens have been bonded together, it is impossible or very difficult to disassemble the headlamp.

It is therefore not possible to work on the headlamp, repair or replace the lens. Thus, at the end of the headlamp's life or in the event of damage, the headlamp is crushed and then burnt, with no possibility of recycling. It might be possible to make the adhesive more flexible so that the housing and lens could be disassembled, but this would be too time-consuming and uneconomical.

SUMMARY

The invention aims at solving the above problems.

According to a first aspect of the disclosure, a headlamp assembly for a vehicle comprises:

- a housing including a bonding groove provided with at least one inner wall,
- a lens to be assembled to the housing by means of an assembly end of the lens placed in a bonding element located in the bonding groove, wherein the headlamp assembly further comprises:
- a housing bonding element removal system, positioned on at least one inner wall of the bonding groove, and
- a disassembly system comprising at least one disassembly element on the housing, the disassembly element being movable towards the lens and capable of disassembling the lens from the housing by pressing against the lens when moved.

The headlamp assembly preferably further comprises a lens bonding element removal system, positioned on the assembly end of the lens.

The first aspect of the disclosure may seek to provide a headlamp assembly whose housing and lens can be easily assembled and disassembled. The cooperation between the housing bonding element removal system, possibly the lens bonding element removal system, and the disassembly system effectively removes the bonding element from the wall(s) of the bonding groove. The housing bonding element removal system is designed to removed at least part of the bonding element present on the inner wall(s) of the bonding groove. The lens bonding element removal system is designed to removed at least part of the bonding element present on the assembly end of the lens.

In some examples, said at least one disassembly element is a disassembly screw movable towards the lens by screwing and capable of disassembling the lens from the housing by pressing against the lens when screwed.

In some examples, the housing bonding element removal system is a housing cord and the lens bonding element removal system is a lens cord.

In some examples, the housing cord and the lens cord are made of natural or synthetic fibres.

In some examples, the housing cord and the lens cord are stiffened by a stiffening agent.

In some examples, the bonding groove has a U-shaped cross-section including one base wall and two longitudinal walls, the housing cord being positioned on the base wall and on the longitudinal walls.

In some examples, the bonding element is a polymer adhesive.

In some examples, the bonding element is a polyurethane adhesive.

In some examples, a vehicle comprises a headlamp assembly described above.

In some examples, the vehicle is a truck.

According to a second aspect of the disclosure, a method for assembling a headlamp assembly described above comprises:

- providing a housing including a bonding groove provided with at least one inner wall,
- providing a lens including an assembly end,
- positioning a housing bonding element removal system on at least one inner wall of the bonding groove,
- positioning a lens bonding element removal system on the assembly end of the lens,
- positioning a bonding element inside the bonding groove, and
- positioning the assembly end of the lens in the bonding element.

In some examples, the method further comprises:

- removing the housing bonding element removal system,
- moving at least one disassembly element of the housing towards the lens in order to disassembly the lens from the housing by pressing the lens, and
- removing the lens bonding element removal system.

In some examples, said at least one disassembly element is a disassembly screw movable towards the lens by screwing and capable of disassembling the lens from the housing by pressing the lens when screwed.

In some examples, the housing bonding element removal system is a housing cord and wherein the lens bonding element removal system is a lens cord.

In some examples, the bonding groove has a U-shaped cross-section including one bottom wall and two side walls, the housing cord being positioned on the bottom wall and on the side walls.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
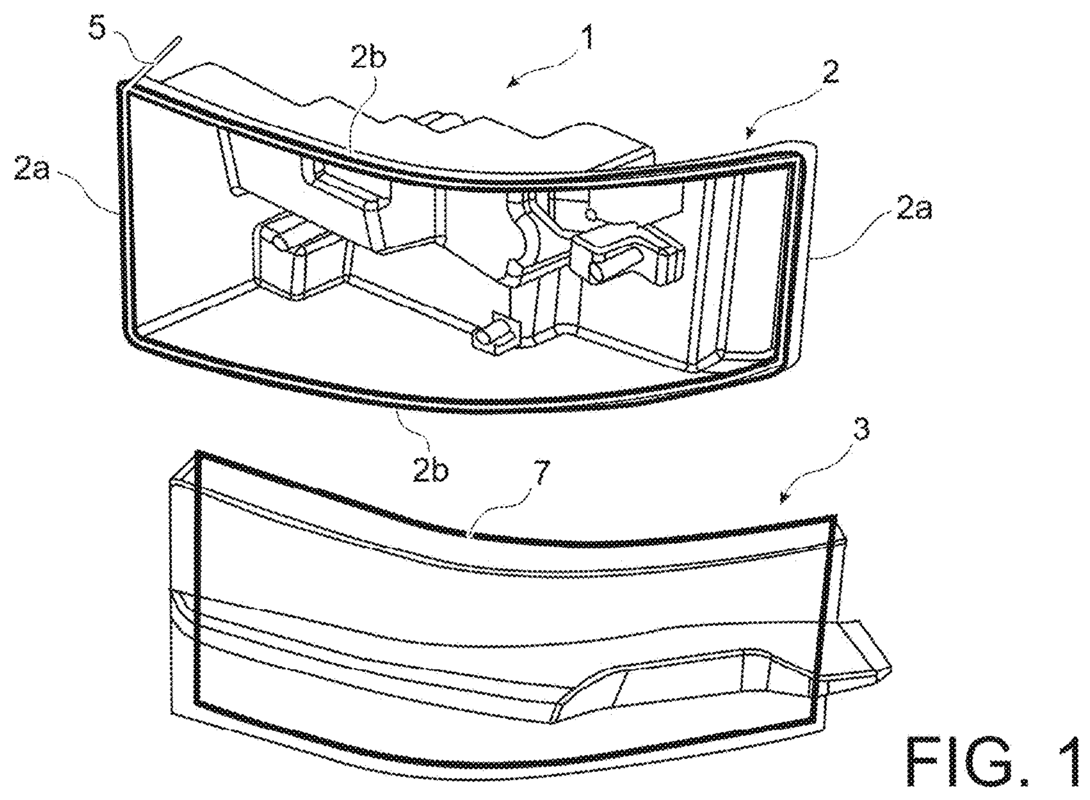
FIG. 1 is an exploded perspective view of a headlamp assembly of the invention.
Figure 2:
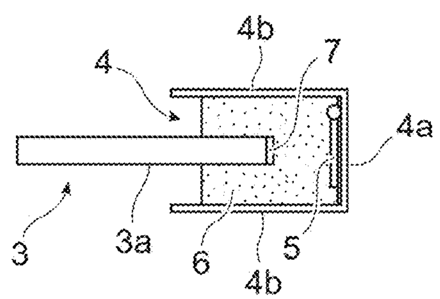
FIG. 2 is a cross-sectional view of a portion of the housing of the headlamp assembly of FIG. 1.

FIG. 1 is an exploded perspective view of a headlamp assembly of the invention. FIG. 2 is a cross-sectional view of a portion of the housing of the headlamp assembly of FIG. 1.

The headlamp assembly 1 comprises a housing 2 and a lens 3.

The housing 2 includes bulbs or light-emitting devices. The lens 3 is made of glass or plastic, typically of polycarbonate, through which the light emitted by the bulbs or emitting devices is projected.

The housing 2 comprises a bonding groove 4 which is arranged around the entire periphery of the housing 2. The periphery comprises two straight vertical parts **2*a* and two curved horizontal parts 2*b*. An upper horizontal part 2*b* connects the two vertical side parts 2*a* at an upper part of the vertical side parts 2*a*, whereas a lower horizontal part 2*b* connects the two vertical side parts 2*a* at a lower part of the vertical side parts 2*a*. The bonding groove 4 typically has a U-shaped cross-section axially oriented, substantially along the axis of the vehicle in the operational configuration of the headlamp assembly 1. The bonding groove 4 includes one base wall 4*a* and two longitudinal walls 4*b***.

The headlamp assembly 1 further comprises a housing bonding element removal system 5 intended to be arranged in the bonding groove 4 of the housing 2. The housing bonding element removal system 5 is typically a cord. As shown, the housing bonding element removal system 5 is arranged at least on the base wall **4*a*. The housing bonding element removal system 5 can also be arranged both on the base wall 4*a* and on the two longitudinal walls 4*b* of the sealing groove 4**.

A layer of a bonding element 6 (an adhesive or glue) is placed inside the sealing groove 4 to fix an assembly end **3*a* of the lens 3 to the housing 2. A lens bonding element removal system 7 is on the assembly end 3*a*. The lens bonding element removal system 7** is typically a cord.

Figure 3:
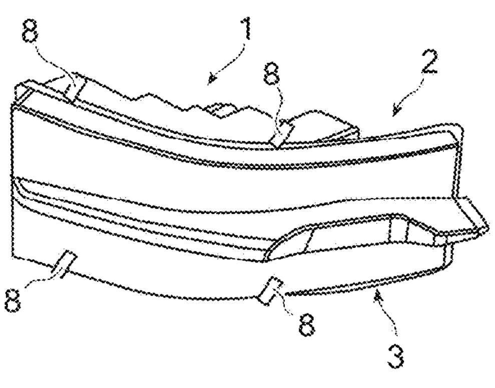
FIG. 3 is a perspective view of the headlamp assembly, in an assembled configuration.
Figure 4:
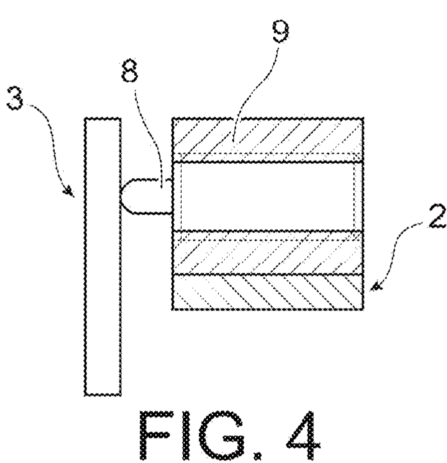
FIG. 4 is a cross-sectional view of a portion of the housing of the headlamp assembly of FIG. 3.

FIG. 3 is a perspective view of the headlamp assembly 1, in an assembled configuration. FIG. 4 is a cross-sectional view of a portion of the housing of the headlamp assembly of FIG. 3.

To facilitate disassembly of the lens 3 from the housing 2, disassembly screws 8 are provided in the housing 2. Each disassembly screw 8 is arranged inside a threaded housing 9 on the housing 2. The disassembly screws 8 face the lens 3. The number of disassembly screws 8 may vary. As an example, four disassembly screws 8 are represented, including two upper disassembly screws 8 and two lower disassembly screws 8. The disassembly screws 8 are advantageously arranged around the periphery of the housing 2, and preferably on the upper part **2*b* and on the lower part 2*b* of the periphery of the housing 2. For example, and as illustrated, two disassembly screws 8 can be arranged on the upper part 2*b* and two disassembly screws 8 can be arranged on the lower part 2*b*. In the assembled configuration, the housing 2 and the lens 3 are assembled together and the disassembly screw 8 is at a predetermined position from the lens 3**.

Figure 5:
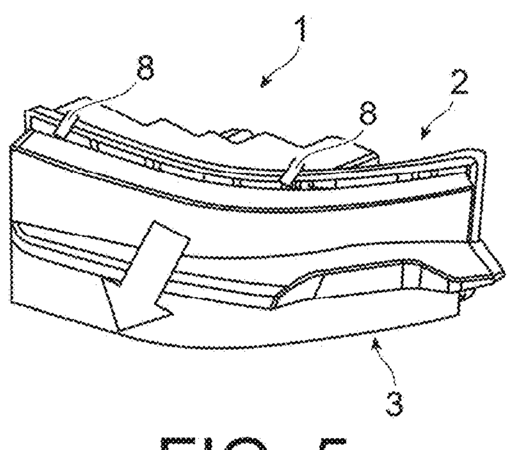
FIG. 5 is a perspective view of the headlamp assembly, in a disassembled configuration.
Figure 6:
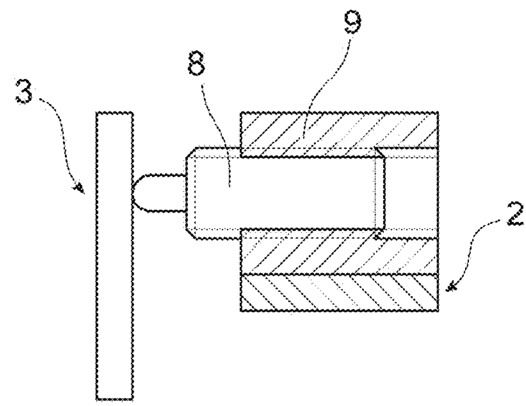
FIG. 6 is a cross-sectional view of a portion of the housing of the headlamp assembly of FIG. 5.

FIG. 5 is a perspective view of the headlamp assembly 1, in a disassembled configuration. FIG. 6 is a cross-sectional view of a portion of the housing of the headlamp assembly of FIG. 5.

In the disassembled configuration, the disassembly screws 8 are turned, moving the disassembly screws 8 towards the lens 3. The disassembly screws 8 exert pressure on the lens 3 and then move the lens 3 so that the lens 3 is disassembled from the housing 2. More specifically, the disassembly screws 8 exert a force on the lens 3 to over the force of the bonding element 6.

The remainder of the description is devoted to a method of assembly and disassembly of the housing 2 and the lens 3 using the headlamp assembly 1.

Figure 7:
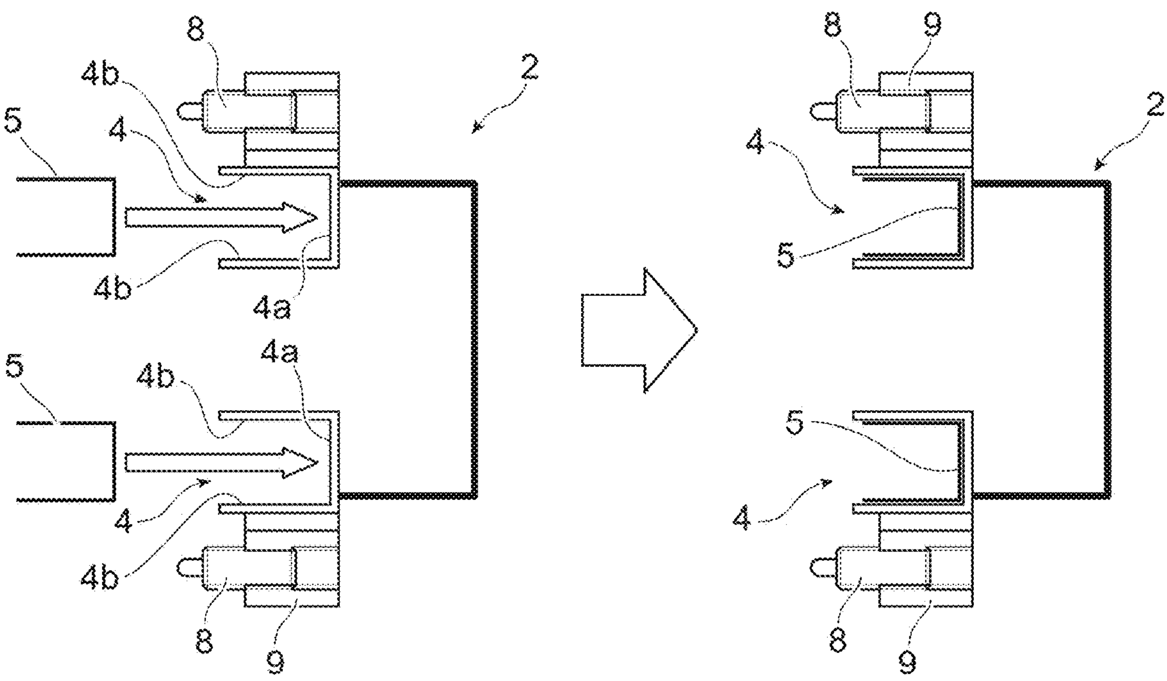
FIG. 7 is a schematic cross-sectional view of the housing of the headlamp assembly, in a first step of a method for assembling the headlamp assembly.

FIG. 7 is a schematic cross-sectional view of the housing, in a first step of a method for assembling the headlamp assembly 1.

In this step, the housing bonding element removal system 5 is placed inside the bonding groove 4, and more specifically on at least one inner wall of the bonding groove 4, preferably on the base wall **4*a* and on the two longitudinal walls 4*b***.

The housing bonding element removal system 5 is preferably arranged so as to cover as much of the surface of the bonding groove 4 as possible. For example, the housing bonding element removal system 5 can form folds that touch each other, like very tight sinusoids.

Figure 8:
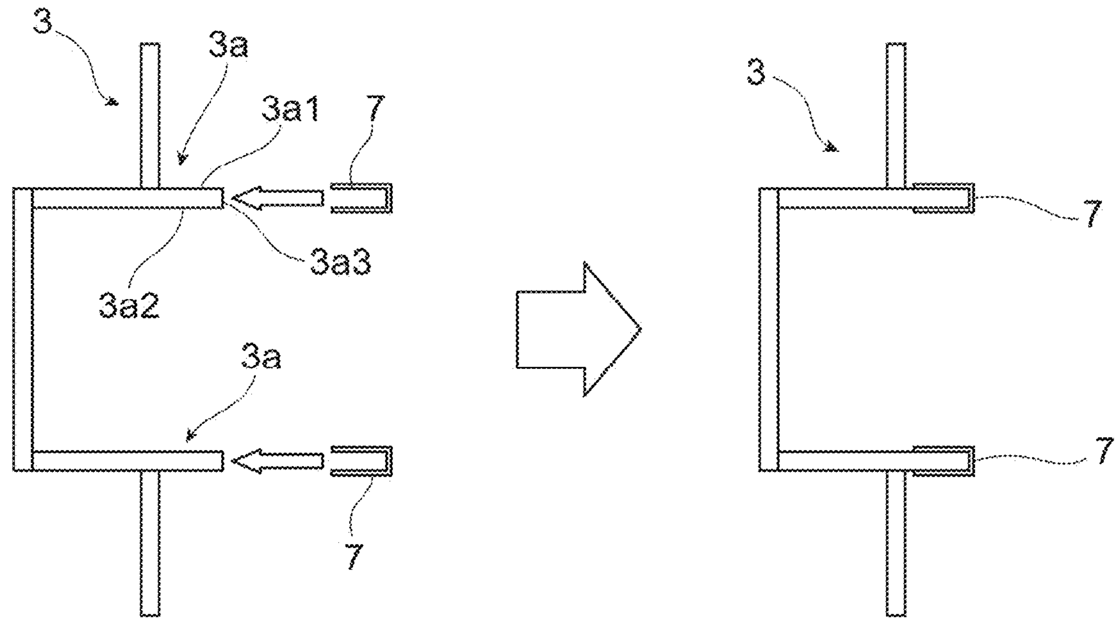
FIG. 8 is a schematic cross-sectional view of a lens of the headlamp assembly, in a second step of the method for assembling the headlamp assembly.

FIG. 8 is a schematic cross-sectional view of the lens 3 of the headlamp assembly 1, in a second step of the method for assembling the headlamp assembly 1.

The lens 3 comprises on the side of the housing 2 the axial assembly end **3*a* designed to be inserted into the bonding groove 4. In particular, the assembly end 3*a* is designed to be immersed in the bonding element 6 (for example an adhesive) placed inside the bonding groove 4. The assembly end 3*a* forms a perimeter that can be inserted into the bonding groove 4**.

During this step, the lens bonding element removal system 7 is positioned on the assembly end 3*a* of the lens 3 so as to surround the assembly end 3*a*. In particular, the lens bonding element removal system 7 can be arranged on at least one wall of the assembly end 3*a*, for instance on an upper wall 3*a*1, a lower wall 3*a*2 and a rear wall 3*a*3. In the same way as for the bonding element removal system 5, the lens bonding element removal system 7 can be arranged so as to cover as much of the surface of the assembly end 3*a* as possible. For example, the lens bonding element removal system 7 can form folds that touch each other, like very tight sinusoids.

The housing bonding element removal system 5 and the lens bonding element removal system 7 can be made of natural or synthetic fibres, of cotton or polyamide, for example. The housing bonding element removal system 5 and the lens bonding element removal system 7 are advantageously stiffened, for example by means of a lacquer or a resin, so that the housing bonding element removal system 5 and the lens bonding element removal system 7 can retain their shape. A single housing bonding element removal system 5 and a single lens bonding element removal system 7 are preferable.

Figure 9:
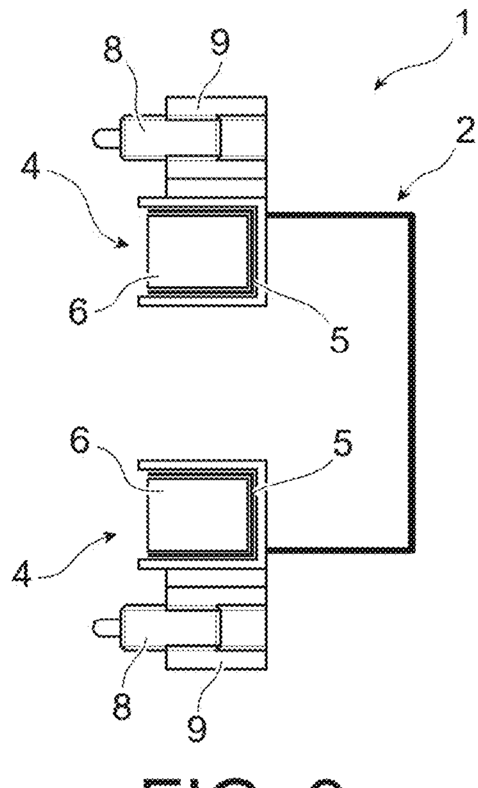
FIG. 9 is a schematic cross-sectional view of the housing, in a third step of the method for assembling the headlamp assembly.

FIG. 9 is a schematic cross-sectional view of the housing 2, in a third step of the method for assembling the headlamp assembly 1.

During this step, the bonding element 6 is placed inside the bonding groove 4. The bonding element 6 is typically an adhesive, for instance a polymer adhesive such as a polyurethane, preferably a hot-melt polyurethane. The adhesive 6 at least partially fills the bonding groove 4 and is in contact with the housing bonding element removal system 5 which is thus bonded to the walls 4*a*, 4*b* of the bonding groove 4.

Figure 10:
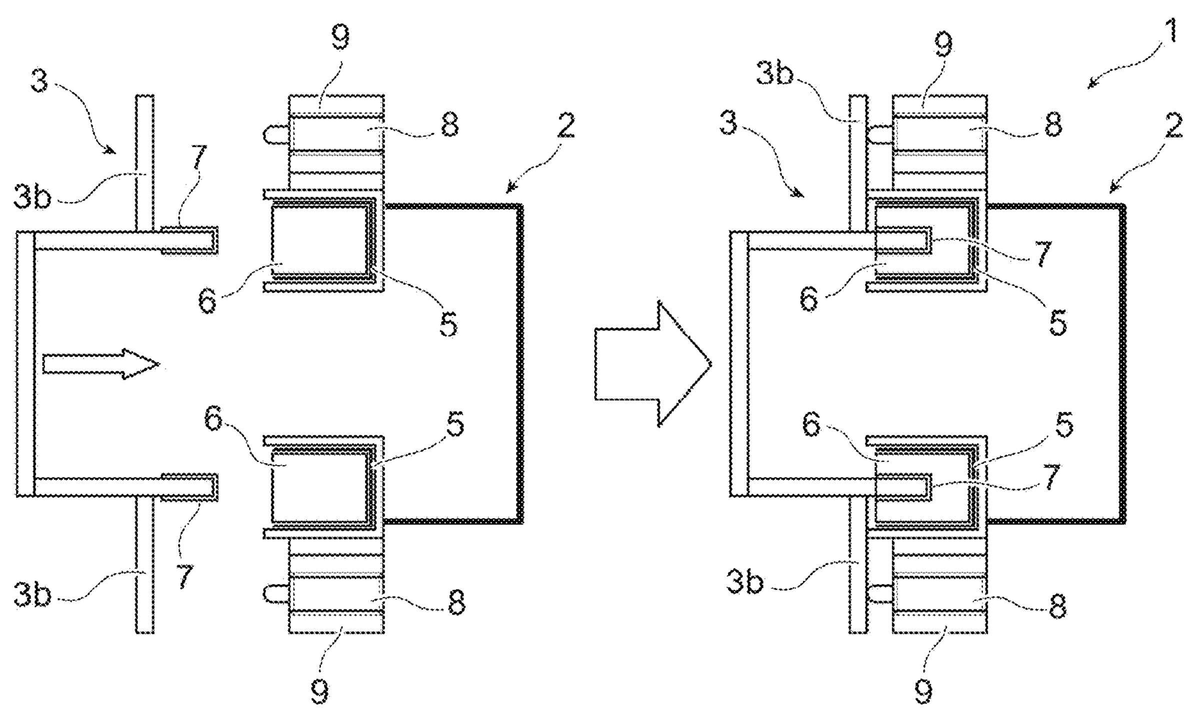
FIG. 10 is a schematic cross-sectional view of the housing and the lens, in a fourth step of the method for assembling the headlamp assembly.

FIG. 10 is a schematic cross-sectional view of the housing 2 and the lens 3, in a fourth step of the method for assembling the headlamp assembly 1.

The lens 3 is moved axially towards the housing 2 until the assembly end 3*a* of the lens 3, covered by the lens bonding element removal system 7, is immersed in the adhesive 6. This gives the assembled configuration in which the lens 3 is fixed to the housing 2.

Figure 11:
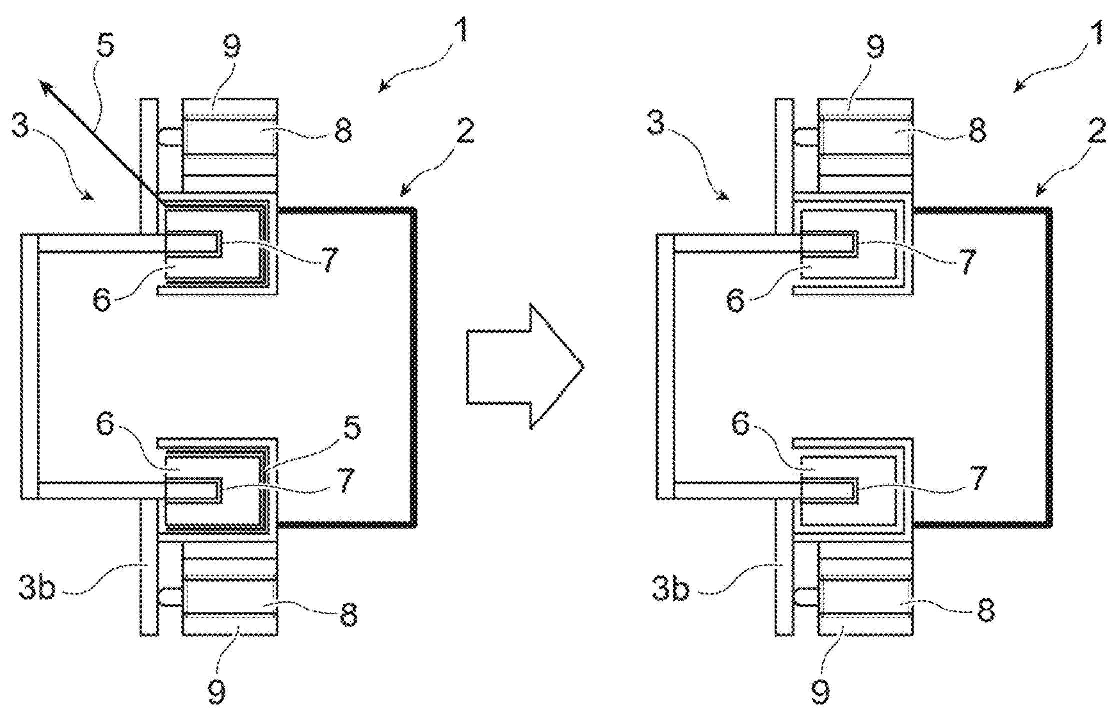
FIG. 11 is a schematic cross-sectional view of the headlamp assembly, in a first step of a method for disassembling the headlamp assembly.

FIG. 11 is a schematic cross-sectional view of the headlamp assembly 1, in a first step of a method for disassembling the headlamp assembly 1.

In this first step, the housing bonding element removal system 5 is removed which removes most of the adhesive 9 between the housing 2 and the housing bonding element removal system 5.

Figure 12:
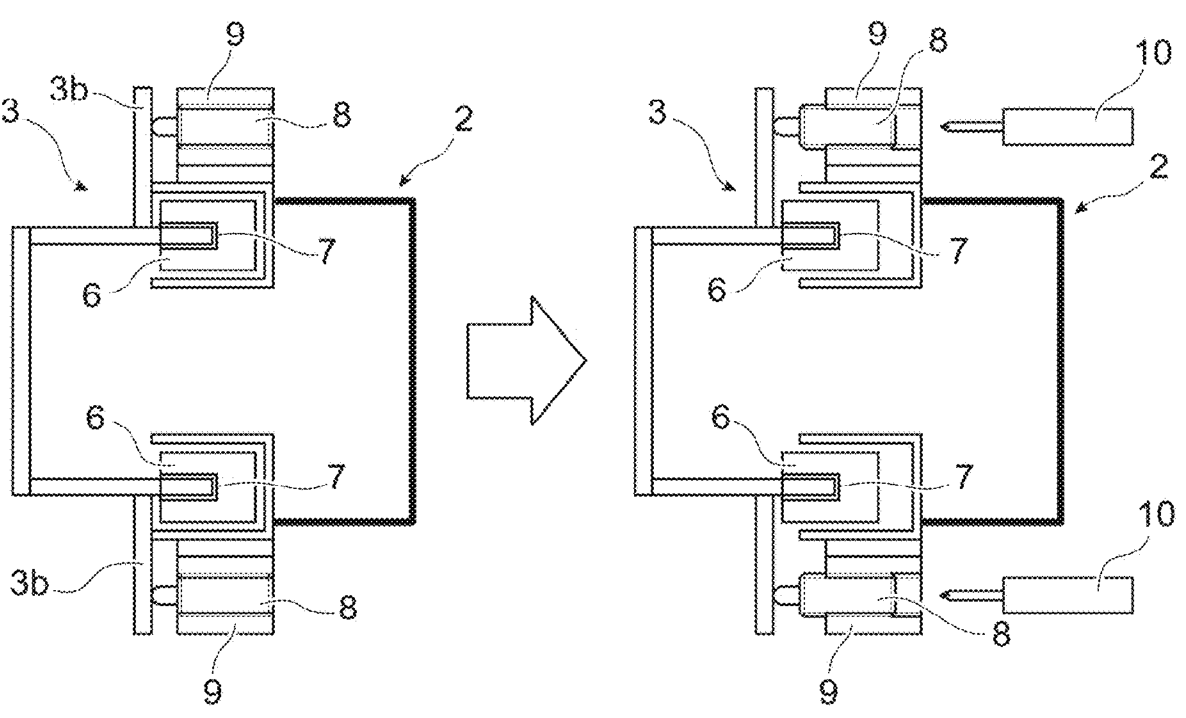
FIG. 12 is a schematic cross-sectional view of the headlamp assembly, in a second step of the method for disassembling the headlamp assembly.

FIG. 12 is a schematic cross-sectional view of the headlamp assembly 1, in a second step of the method for disassembling the headlamp assembly.

A disassembly system comprising at least one disassembly screw 8 placed inside a threaded housing 9 is arranged around and radially outside the bonding groove 4. The disassembly screws 8 are positioned close to a transverse plate 3*b* of the lens 3 on which the disassembly screws 8 will exert pressure under the action of screwing them.

In order to remove the adhesive 6 that remains on the housing 2 and so to be able to completely disassemble the lens 3 from the housing 2, the disassembly screws 8 are operated using a screwdriver 10. When screwed in, the disassembly screws 8 move axially in the direction of the transverse support wall 3*b* of the lens 3. The disassembly screws 8 then exert pressure on the transverse support wall 3*b*, causing the lens 3 to move axially and disassemble from the housing 2.

Figure 13:
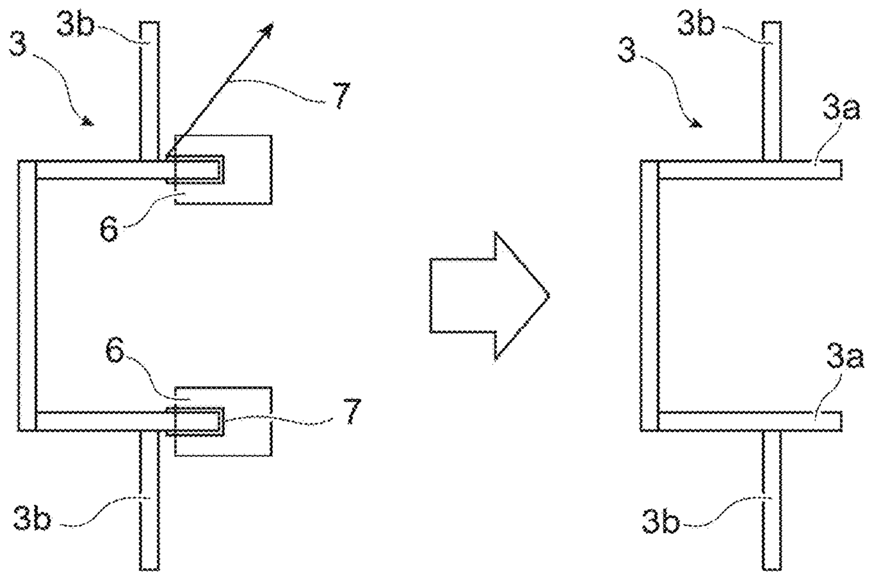
FIG. 13 is a schematic cross-sectional view of the lens of the headlamp assembly, in a third step of the method for disassembling the headlamp assembly.

FIG. 13 is a schematic cross-sectional view of the lens 3 of the headlamp assembly 1, in a third step of the method for disassembling the headlamp assembly 1.

During this final step, the lens bonding element removal system 7 is removed which removes the adhesive 6 from the lens 3. As the lens 3 is generally made of polycarbonate, it must not be contaminated by adhesive if it is to be recycled. The use of the lens bonding element removal system 7 makes it possible to mechanically remove the adhesive 6 from the assembly end 3 of the lens 3.

The disclosure can be applied in heavy-duty vehicles, such as trucks, buses, and construction equipment.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A headlamp assembly for a vehicle, comprising:
a housing including a bonding groove provided with at least one inner wall,
a lens to be assembled to the housing by means of an assembly end of the lens placed in a bonding element located in the bonding groove,
wherein the headlamp assembly further comprises:
a housing bonding element removal system, positioned on at least one inner wall of the bonding groove, and
a disassembly system comprising at least one disassembly element on the housing, the disassembly element being movable towards the lens and capable of disassembling the lens from the housing by pressing against the lens when moved.

2. The headlamp assembly of claim 1, wherein it further comprises a lens bonding element removal system, positioned on the assembly end of the lens.

3. The headlamp assembly of claim 1, wherein said at least one disassembly element is a disassembly screw movable towards the lens by screwing and capable of disassembling the lens from the housing by pressing against the lens when screwed.

4. The headlamp assembly of claim 2, wherein the housing bonding element removal system is a housing cord and wherein the lens bonding element removal system is a lens cord.

5. The headlamp assembly of claim 4, wherein the housing cord and the lens cord are made of natural or synthetic fibres.

6. The headlamp assembly of claim 4, wherein the housing cord and the lens cord are stiffened by a stiffening agent.

7. The headlamp assembly of claim 1, wherein the bonding groove has a U-shaped cross-section including one base wall and two longitudinal walls, the housing cord being positioned on the base wall and on the longitudinal walls.

8. The headlamp assembly of claim 1, wherein the bonding element is a polymer adhesive.

9. The headlamp assembly of claim 8, wherein the bonding element is a polyurethane adhesive.

10. A vehicle comprising a headlamp assembly according to claim 1.

11. A method for assembling a headlamp assembly according to claim 1, the method comprising:
providing a housing including a bonding groove provided with at least one inner wall,
providing a lens including an assembly end,
positioning a housing bonding element removal system on at least one inner wall of the bonding groove,
positioning a lens bonding element removal system on the assembly end of the lens,
positioning a bonding element inside the bonding groove, and
positioning the assembly end of the lens in the bonding element.

12. The method of claim 11, further comprising:
removing the housing bonding element removal system,
moving at least one disassembly element of the housing towards the lens in order to disassembly the lens from the housing by pressing against the lens, and
removing the lens bonding element removal system.

13. The method of claim 12, wherein said at least one disassembly element is a disassembly screw movable towards the lens by screwing and capable of disassembling the lens from the housing by pressing the lens when screwed.

14. The method of claim 11, wherein the housing bonding element removal system is a housing cord and wherein the lens bonding element removal system is a lens cord.

15. The method of claim 11, wherein the bonding groove has a U-shaped cross-section including one bottom wall and two side walls, the housing cord being positioned on the bottom wall and on the side walls.

* * * * *